(12) United States Patent
Wendlandt et al.

(10) Patent No.: US 6,375,471 B1
(45) Date of Patent: Apr. 23, 2002

(54) ACTUATOR FOR INDEPENDENT AXIAL AND ROTATIONAL ACTUATION OF A CATHETER OR SIMILAR ELONGATED OBJECT

(75) Inventors: Jeffrey Michael Wendlandt, Cambridge; Frederick Marshall Morgan, Quincy, both of MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/113,273

(22) Filed: Jul. 10, 1998

(51) Int. Cl.⁷ .............................................. G09B 23/28
(52) U.S. Cl. ...................................... 434/262; 434/272
(58) Field of Search ................................ 345/156, 161; 434/234, 265, 267, 272, 275, 262

(56) References Cited

U.S. PATENT DOCUMENTS 5,623,582 A     4/1997   Rosenberg .................... 395/99
5,821,920 A  * 10/1998   Rosenberg et al. ......... 345/156

FOREIGN PATENT DOCUMENTS

| WO | WO 96/16397 | 11/1995 |
| WO | WO 96/28800 | 3/1996 |
| WO | WO 97/19440 | 11/1996 |
| WO | WO 98/09580 | 9/1997 |

* cited by examiner

*Primary Examiner*—Sam Rimell
(74) *Attorney, Agent, or Firm*—Dirk Brinkman

(57) ABSTRACT

An actuator is used in a surgical simulation system that simulates the catheterization of cardiac or peripheral vasculature. The simulation system provides haptic feedback to a user of a catheter or similar elongated object coupled to the system. The actuator includes sensors that generate sense signals indicative of axial translation and rotation of the object by the user. The sense signals are provided to a workstation executing a simulation program. In response to the sense signals, the workstation calculates axial forces and torques to be applied to the object as haptic feedback to the user, and generates drive signals representing the calculated axial forces and torques. Mechanisms within the actuator respond to the drive signals by applying corresponding axial force and torque to a rigid tube that is mechanically coupled to the object. One embodiment of the actuator includes a carriage assembly for holding the rigid tube between a pair of opposed pinch wheels. The carriage assembly rotates to rotate the object about its longitudinal axis, and the pinch wheels rotate to translate the object axially. Another actuator embodiment includes a first bearing mounted on a rotary actuator and a second bearing mounted on a sliding linear actuator. The rigid tube has a square cross section for secure engagement by the second actuator. The linear actuator grips the tube and allows it to freely rotate about its longitudinal axis.

9 Claims, 10 Drawing Sheets

ACTUATOR FOR INDEPENDENT AXIAL AND ROTATIONAL ACTUATION OF A CATHETER OR SIMILAR ELONGATED OBJECT

BACKGROUND OF THE INVENTION

The present invention is related to the field of simulator systems that provide haptic or tactile feedback to a user, and more particularly to such simulators used to train physicians in the use of a set of catheters or similar tubular objects.

There is a trend toward increasing use of "minimally-invasive" surgical techniques, meaning techniques in which medical tools are inserted into a patient's body through a relatively small opening in the skin and manipulated from outside the body. In one example of a minimally invasive surgical technique known as "balloon angioplasty", concentric catheters are inserted into a patient's body and guided into a restricted blood vessel, such as a cardiac artery or a peripheral blood vessel suffering a blockage. One of the catheters, called a "balloon catheter" because it has a balloon-like inflatable chamber near the end, is guided into the blood vessel. The balloon-like chamber is inflated to stretch the vessel in the region of the blockage, so that the restricted passage is enlarged.

Because many of the minimally-invasive procedures now being practiced are relatively new, there is an increased need for training doctors or other medical personnel to perform the procedures. Traditionally, surgical training is performed on animals, cadavers or patients. These training methods all have drawbacks that make them either ineffective or undesirable in some cases. Animals are good for training, but expenses and ethical concerns limit their use. Cadavers are also expensive. Also, because the procedure is inherently complex and has associated risks, it is undesirable for inexperienced doctors to perform the procedure on human patients.

An alternative training method involves the use of a simulator. A simulator includes a set of sensors and actuators that interact with the tools being used by the doctor being trained. The simulator also includes a computer that executes a simulation program that includes a model of the physical environment being simulated. For example, a simulator for diagnostic radiology includes a model of a catheter and a blood vessel in which the catheter is inserted and maneuvered. The simulator senses movement or forces exerted on the tools by the doctor to track the position of the simulated catheter in the simulated vessel. When the simulation indicates that the catheter has bumped against a wall of the blood vessel, the simulator activates devices that provide forces to the tools that mimic the forces that would be experienced by the doctor during the real diagnostic radiology procedure.

It is generally desirable that a medical procedure simulator provide a high degree of realism, so that the maximum benefit is obtained from simulation-based training. In particular, it is desirable that a simulator be capable of mimicking the many combinations of forces and torques that can act on a tool during a medical procedure, these forces being commonly referred to as "haptic feedback". A simulator that provides realistic haptic feedback enables a doctor to better develop the skill required to manipulate a tool in the precise manner required by the procedure.

One known simulator uses an actuator manufactured by Bertec, Inc. of Columbus, Ohio. The Bertec actuator uses a mouse-like mechanism including a ball in contact with a catheter to sense the catheter's axial rotation and translation. The Bertec actuator also applies compression to the catheter to simulate frictional forces that act on the catheter and that are felt by the physician during a catheterization procedure.

The Bertec actuator suffers drawbacks. The ball used to sense translation and rotation is directly in contact with the catheter, and may slip on the catheter surface as the catheter is manipulated. Any such slippage reduces the accuracy of the position information provided by the actuator. Also, haptic feedback generated by compression alone is not very realistic. The Bertec device acts like a variable resistor, because the force fed back to the user is caused by the sliding and static friction from the compression device. During real catheterization, the catheter encounters moving elastic tissues which actively push back at the catheter when the tissues are stretched. The Bertec device cannot simulate such active forces, because it is a passive device. Also, simple compression cannot realistically simulate the effect of multiple forces or torques operating in different directions.

Other known actuators and actuator systems used for haptic feedback have features similar to the Bertec device, and thus suffer similar drawbacks.

It would be desirable to improve the realism of simulated medical procedures used in medical training in order to improve the quality of the training. In particular it would be desirable to have an actuator system having highly accurate sensors and actuators capable of providing realistic haptic feedback, so that physicians can train effectively before performing medical procedures on patients.

BRIEF SUMMARY OF THE INVENTION

In accordance with the present invention, an actuator is disclosed in which the translational and rotational positions of an elongated object are tracked with high accuracy. The actuator is employed to provide the user with realistic haptic feedback in a simulator such as a surgical simulator.

In one embodiment the actuator includes a plurality of motors and a mechanical interface mechanically coupling the motors to the object. The mechanical interface is configured to apply mutually independent axial force and axial torque to the object in response to respective torques generated by the motors in response to drive signals supplied to the motors. One such mechanical interface employs a carriage assembly including a pair of pinch roller wheels mechanically coupled to one of the motors. The pinch roller wheels are located on opposite sides of the elongated object, and can be clamped over the object such that the wheels engage the object. When the wheels engage the object, the rotation of the wheels via activation of the motors causes the object to be translated axially.

By virtue of its ability to apply independent axial force and torque to the object, the actuator can provide more realistic haptic feedback to the user of the object. Additionally, the pinch roller wheels enable the actuator to securely grip the object throughout its motion, so that the object's position can be accurately sensed.

In another embodiment the actuator employs first and second bearings each having an interior portion surrounding a central opening through which the object extends. The interior portion of the first bearing is cooperatively configured with the object such that the first bearing and the object can be freely moved with respect to each other in the direction of the longitudinal axis of the object, and the first bearing and the object are coupled for joint rotation about the longitudinal axis of the object. In addition to the interior portion, the second bearing has an outer portion, and is configured such that the outer portion and the object can freely rotate with respect to each other about the longitudinal axis of the object, and the second bearing and the object are mutually coupled for joint movement in the direction of the longitudinal axis of the object. The actuator also includes motors coupled respectively to the bearings for actuation thereof, and sensors that generate sense signals indicative of the translational and rotational positions of the object.

This second actuator embodiment has excellent mechanical coupling between each motor and the object, so that backlash is reduced and accuracy is improved. In part this benefit arises from the cooperative configuration of each bearing and the object. In the disclosed actuator the opening in each bearing is square, as is the cross-section of the object, so that the bearings and the object are tightly coupled for rotation together. The disclosed actuator also employs belt or cable drive between each motor and the corresponding bearing, further improving mechanical coupling between each motor and the object.

Other aspects, features, and advantages of the present invention are disclosed in the detailed description which follows.

DETAILED DESCRIPTION OF THE INVENTION

Figure 1:
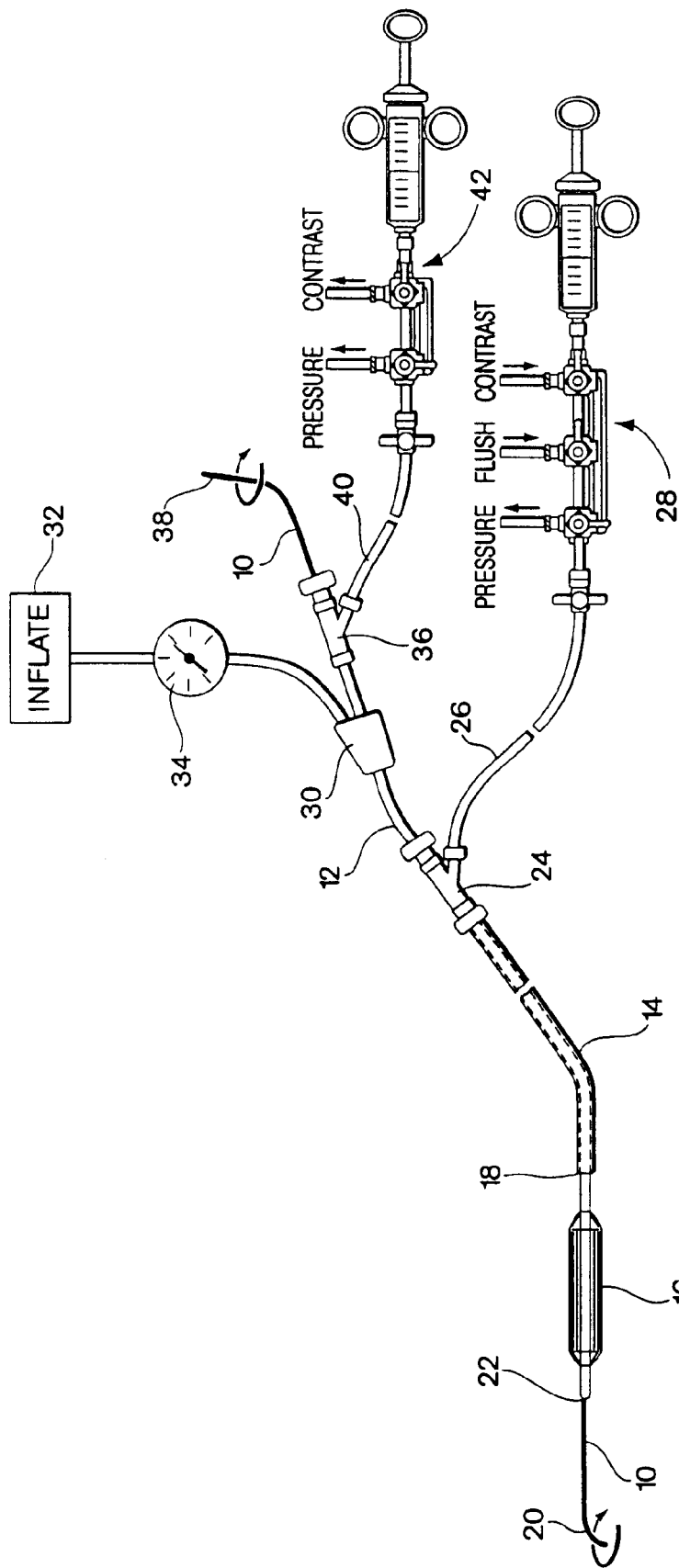
FIG. 1 is a schematic diagram of prior-art apparatus for catheterization of cardiac or peripheral vasculature including a set of concentric catheters.

Apparatus for catheterization of cardiac or peripheral vasculature as is known in the art is illustrated in FIG. 1. As illustrated, the apparatus includes an inner wire 10, a tubular balloon catheter 12, and a tubular guide catheter 14. The balloon catheter 12 includes a dilatation balloon 16 at one end that extends beyond a corresponding end 18 of the guide catheter 14. The wire 10 has a tip 20 that extends beyond the end 22 of the balloon catheter 12.

A first Y adaptor 24 is secured to the guide catheter 14. The balloon catheter 12 extends through one leg of the Y adaptor 24, and tubing 26 is attached to the other leg. The tubing 26 carries contrast and other solutions into the guide catheter 14. The contrast solution enhances the visibility of the vessel being catheterized on imaging equipment used during the catheterization process, enabling the doctor to better guide the catheter. The injection and flushing of the contrast and other solutions is controlled by apparatus 28 as is known in the art.

A coupling 30 enables the attachment of an inflation device 32 and associated pressure meter 34, along with a second Y adaptor 36. A user end 38 of the wire 10 extends from one leg of the Y adaptor 36, and tubing 40 extends from the other leg. The tubing 40 is connected to contrast injection and flushing apparatus 42 used to provide contrast and other solutions to the balloon catheter 12.

In the embodiment of FIG. 1, the ends 20 and 38 of the wire 10 are bent slightly. At the user end 38, the bent section enables the wire 10 to be rotated about its longitudinal axis (also referred to herein as "axial rotation") by a doctor. At the inner or guide end 20, the bent section enables the wire 10 to be steered through turns and branches in the pathway to the vessel being catheterized.

During a balloon angioplasty procedure for a cardiac artery, the guide catheter 14 is first inserted into the femoral artery of a patient so that its end is at the aortic arch, near the opening of a cardiac artery to be operated upon. The guide catheter 14 arrives at this position by being slid along a previously-inserted guide wire (not shown), which is removed after the guide catheter 14 is in place. Next, the balloon catheter 12 and wire 10 together are pushed through the guide catheter 14 to its end. The wire 10 is then manipulated into the artery to the area to be dilated, and the balloon 16 is pushed along the wire 10 into the desired position. In this position the balloon 16 is inflated as necessary to achieve the desired dilation of the artery.

Figure 2:
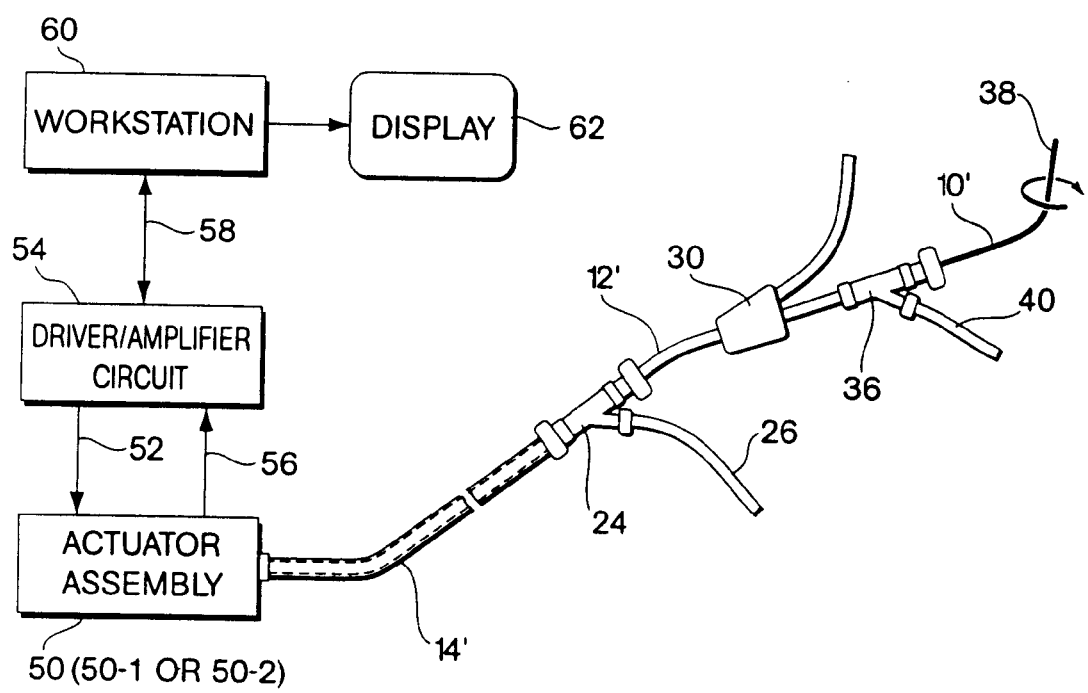
FIG. 2 is a schematic block diagram of a catheterization simulation system employing an actuator assembly according to the present invention.

FIG. 2 depicts a surgical simulation system for simulating the catheterization process. Catheterization apparatus like that in FIG. 1 is used. The contrast control apparatus 28 and 42 and the inflation devices 32 and 34 are not shown in FIG. 2, because the simulation system may be used with or without these components. Wire 10' and catheters 12' and 14' are similar to wire 10 and catheters 12 and 14 shown in FIG. 1, except as described below with reference to FIGS. 3 and 4.

The wire 10' and catheters 12' and 14' enter an actuator assembly 50, which may be either of two different actuators 50-1 and 50-2 described below. The actuator assembly 50 receives electrical drive signals 52 from an electrical driver and amplifier circuit 54, and provides electrical sense signals 56 to the circuit 54. The circuit 54 is in turn connected via a bus 58 to a workstation or similar computer 60 having a display 62.

The actuator assembly 50 contains sensors that sense axial translation and rotation of the wire 10' and catheters 12' and 14' caused by the user of the simulator. Information about rotational and translational positions are provided to the workstation 60 via the sense signals 56 over bus 58. The actuator assembly 50 also applies axial forces and torques to the wire 10' and catheters 12' and 14' in response to the drive signals 52 generated according to data provided to the driver circuit 54 by the workstation 60 over bus 58.

The driver/amplifier circuit 54 contains digital-to-analog converters, analog-to-digital converters, and related circuitry to translate between commands and data on the digital interface bus 58 and analog values of the drive signals 52 and sense signals 56.

The workstation 60 executes a simulation program that simulates relevant portions of patient's anatomy and the catheterization process, including the presentation of images on the display 62 depicting the travel of simulated extensions of the wire 10' and catheters 12' and 14' along simulated blood vessels. The workstation 60 uses the data from the sense signals 56 to sense the manipulation of the wire 10' and catheters 12' and 14' by the user, and the workstation 60 controls the actuator assembly 50 via drive signals 52 to provide active haptic or tactile sensations to the user, to realistically simulate the catheterization process.

More specifically, the simulation begins with the guide catheter 14' almost fully inserted in the simulator; this corresponds to the above-described position of the real catheter 14 at the top of the aortic arch. The display 62 shows an image of a simulated guide catheter in the aortic region. The user then pushes the balloon catheter 12' and wire 10' into the guide catheter; their simulated counterparts appear on the display when they reach the opening at the far end of the guide catheter. From this point the wire 10' and balloon catheter 12' are manipulated separately, and their simulated counterparts are moved correspondingly on the display 62.

Figure 3:
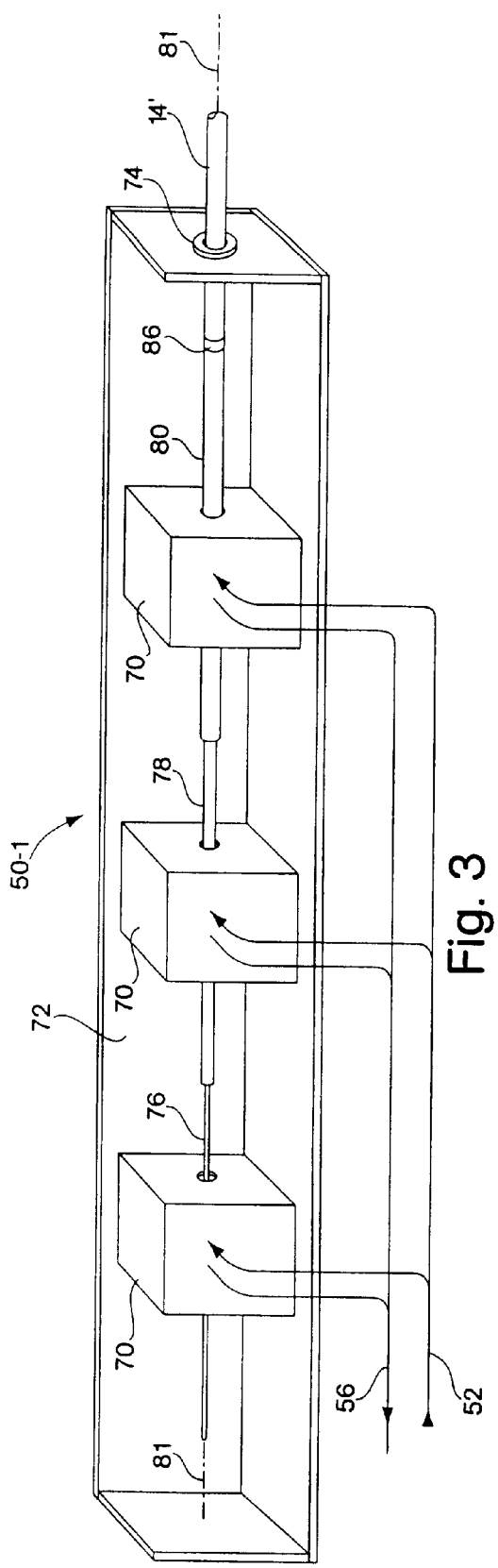
FIG. 3 is a perspective diagram of a first embodiment of an actuator assembly for the system of FIG. 2 including schematically-depicted actuators.
Figure 4:
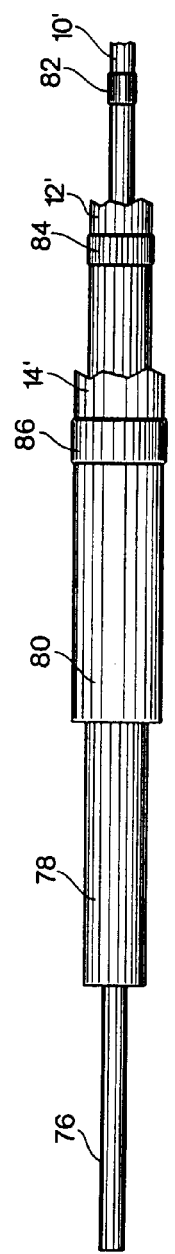
FIG. 4 is a diagram showing the coupling between catheters and corresponding tubes in the actuator assembly of FIG. 3.

FIG. 3 shows a first embodiment of an actuator assembly 50-1 that can be used in the simulation system of FIG. 2. Three actuators 70 are disposed on a base 72 within a housing. Although the actuators 70 are shown as boxes, this representation is schematic only; details of the actuators 70 are shown in FIGS. 5–9 described below. At one end of the base 72, the wire 10' and catheters 12' and 14' enter the base 72 at one end through a sleeve or grommet 74. A set of stiff concentric tubes 76, 78 and 80 are disposed in telescoping fashion through the actuators 70 along an actuation axis 81. As shown in FIG. 4, the wire 10' and the catheters 12' and 14' are connected to corresponding tubes 76, 78 or 80 by corresponding couplers 82, 84 or 86. The couplers 82, 84 and 86 may be pieces of tape, or more complicated automated mechanical devices that provide secure mechanical coupling between each of the corresponding tubes and the respective catheter.

The innermore tubes 76 and 78 each extend beyond their respectively adjacent outer tubes 78 and 80 in order to permit engagement by a corresponding one of the actuators 70. The amount by which each of the innermore tubes 76 and 78 extends beyond the corresponding outermore tube 78 or 80 is chosen to enable each tube to freely travel between a retracted position (toward the right in FIG. 3) and an extended position (toward the left in FIG. 3) without interfering with the travel of the other tubes. The retracted position corresponds to the initial position of the corresponding real wire 10 or catheter 12 or 14 upon being inserted into the femoral artery of a patient; the extended position corresponds to the final position of the corresponding real wire 10 or catheter 12 or 14 after it has been pushed into the vicinity of the vessel being catheterized.

The actuators 70 are placed so that each one engages the corresponding tube 76, 78 or 80 throughout its travel and does not present an obstacle to the travel of the other tubes. Each actuator 70 senses the axial translation and axial rotation of the corresponding tube 76, 78 or 80 with sensors which are described below in greater detail. The sensors provide indications of axial translation and rotation via the sense signals 56. Each actuator 70 includes motors which are responsive to corresponding ones of the drive signals 52 to generate axial force and torque on the corresponding tube 76, 78 or 80. The actuators 70 are described in greater detail below.

Figure 5:
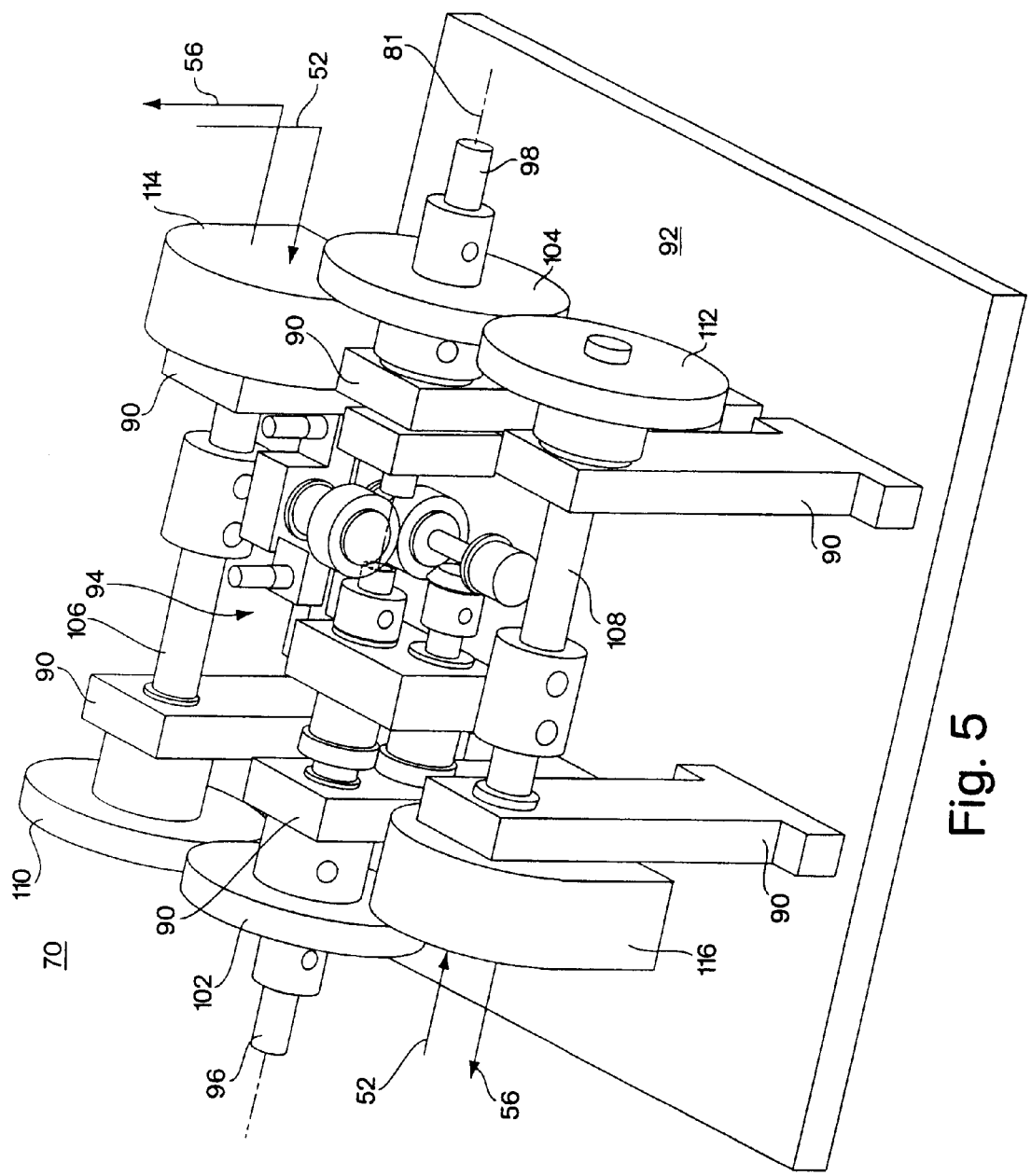
FIG. 5 is a perspective diagram of an actuator in the actuator assembly of FIG. 3.

FIG. 5 shows one embodiment of an actuator 70. Support pedestals 90 extend from a base 92. One pair of the support pedestals 90 supports a carriage assembly 94 via shaft segments 96 and 98 disposed through openings in the pedestals 90 along the actuation axis 81. Also supported on the shaft segments 96 and 98 are a translation control wheel 102 and a rotation control wheel 104. The carriage assembly 94 and rotation control wheel 104 are both secured to the shaft 98, so that rotation of the rotation wheel 104 causes rotation of the carriage assembly 94 about the actuation axis 81. The coupling between the translation control wheel 102 and the carriage assembly 94 is described in greater detail below with respect to FIG. 6.

Additional pairs of support pedestals 90 support drive shafts 106 and 108 in parallel with the actuation axis 81. Each drive shaft 106 and 108 extends through openings in the corresponding pair of support pedestals 90. Drive wheels 110 and 112 are mounted on the drive shafts 106 and 108, respectively. The drive wheel 110 engages the translation control wheel 102, and the drive wheel 112 engages the rotation control wheel 104.

Motor/sensor assemblies 114 and 116 are mechanically coupled to the drive shafts 106 and 108, respectively. Motors within the assemblies 114 and 116 apply torque to the corresponding drive shaft 106 or 108 in response to the drive signals 52. These motors are preferably direct-current (DC) torque motors. The sensor within each assembly 114 and 116 senses the rotational position of the corresponding co-located motor. The sensors may be conventional rotary position encoders or any other suitable devices. The sensors generate sense signals 56 indicating the sensed positions of the respective wheel 102 or 104. The signals 56 may be, for example, respective series of pulses, in which each pulse represents a quantum of rotation of the corresponding motor.

The signal 56 generated by the sensor within the assembly 116 indicates the rotational position of the tube disposed within the actuator 70. The signal 56 generated by the sensor within the assembly 114 provides both rotation and translation information, because of the configuration of the gears on the carriage assembly 94 as described below. Thus in order to obtain the translational position of the tube, the signal 56 from the assembly 114, which indicates purely rotation, is subtracted from the signal 56 from the assembly 116 indicating both rotation and translation.

During operation of the actuator 70 of FIG. 5, one of the tubes 76, 78 or 80 is disposed through the actuator 70 along the actuation axis 81. The user pushes, pulls, and rotates the tube. Pushing and pulling motions of the tube cause the wheel 102 to rotate, and rotation of the tube causes both wheels 102 and 104 to rotate. The rotation of the wheels 102 and 104 is detected by the encoders within the assemblies 114 and 116, and the values of the signals 56 generated by the encoders change correspondingly. The workstation 60 of FIG. 2 receives the position information via the circuit 54. In accordance with the simulation program being executed, the workstation 60 causes the drive signals 52 to take on values corresponding to the desired force and torque to be applied to the tube. These signals drive the motors within the assemblies 114 and 116. The motors apply the desired force and torque via the shafts 106 and 108, the wheels 110 and 112, and the wheels 102 and 104.

Figure 6:
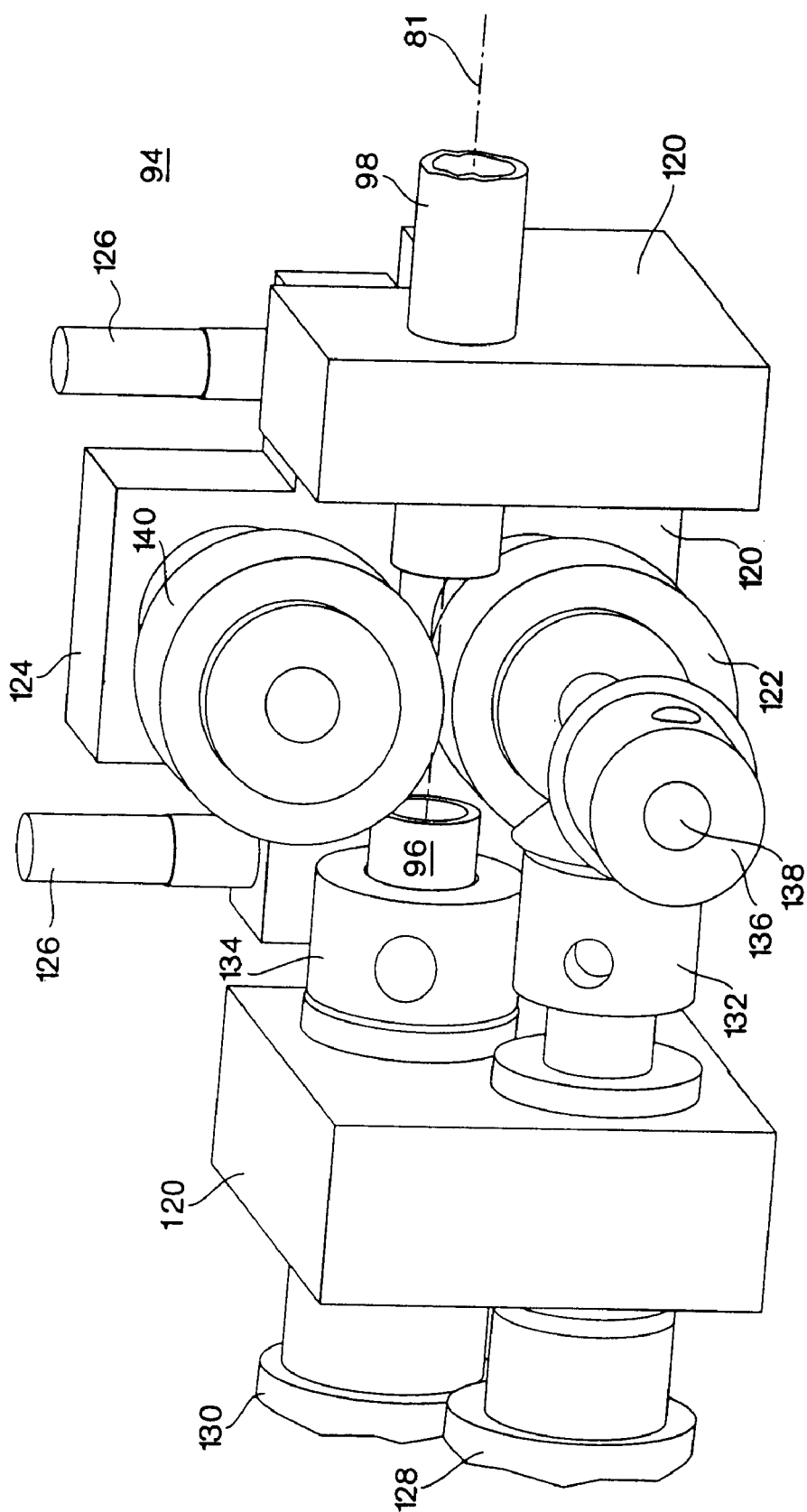
FIG. 6 is a front perspective diagram of a carriage assembly in the actuator of FIG. 5.
Figure 7:
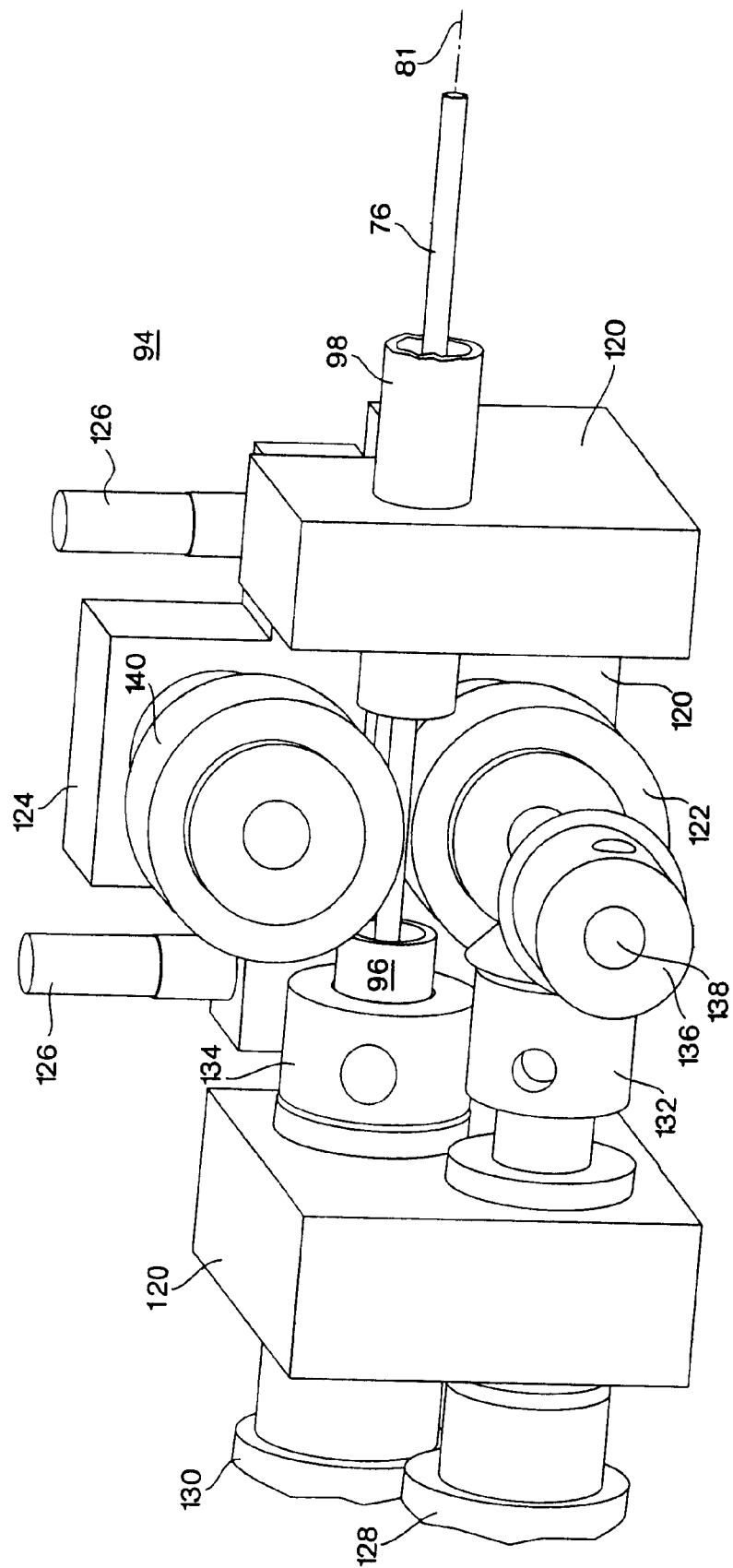
FIG. 7 is a front perspective diagram of the carriage assembly of FIG. 6 holding a tube from the actuator assembly of FIG. 3.
Figure 8:
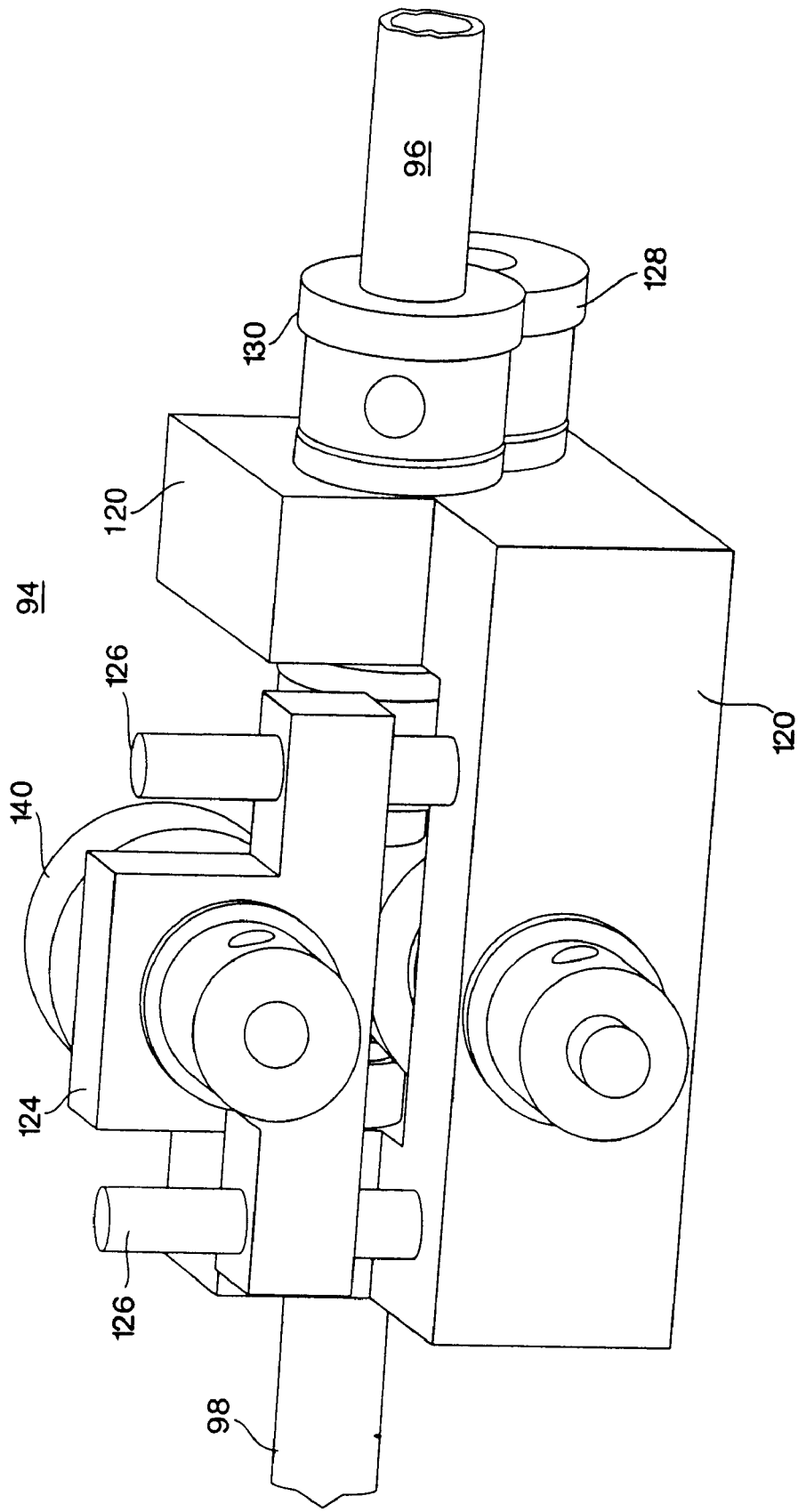
FIG. 8 is a rear perspective diagram of the carriage assembly of FIG. 6 showing a clamping member in an unclamped position.
Figure 9:
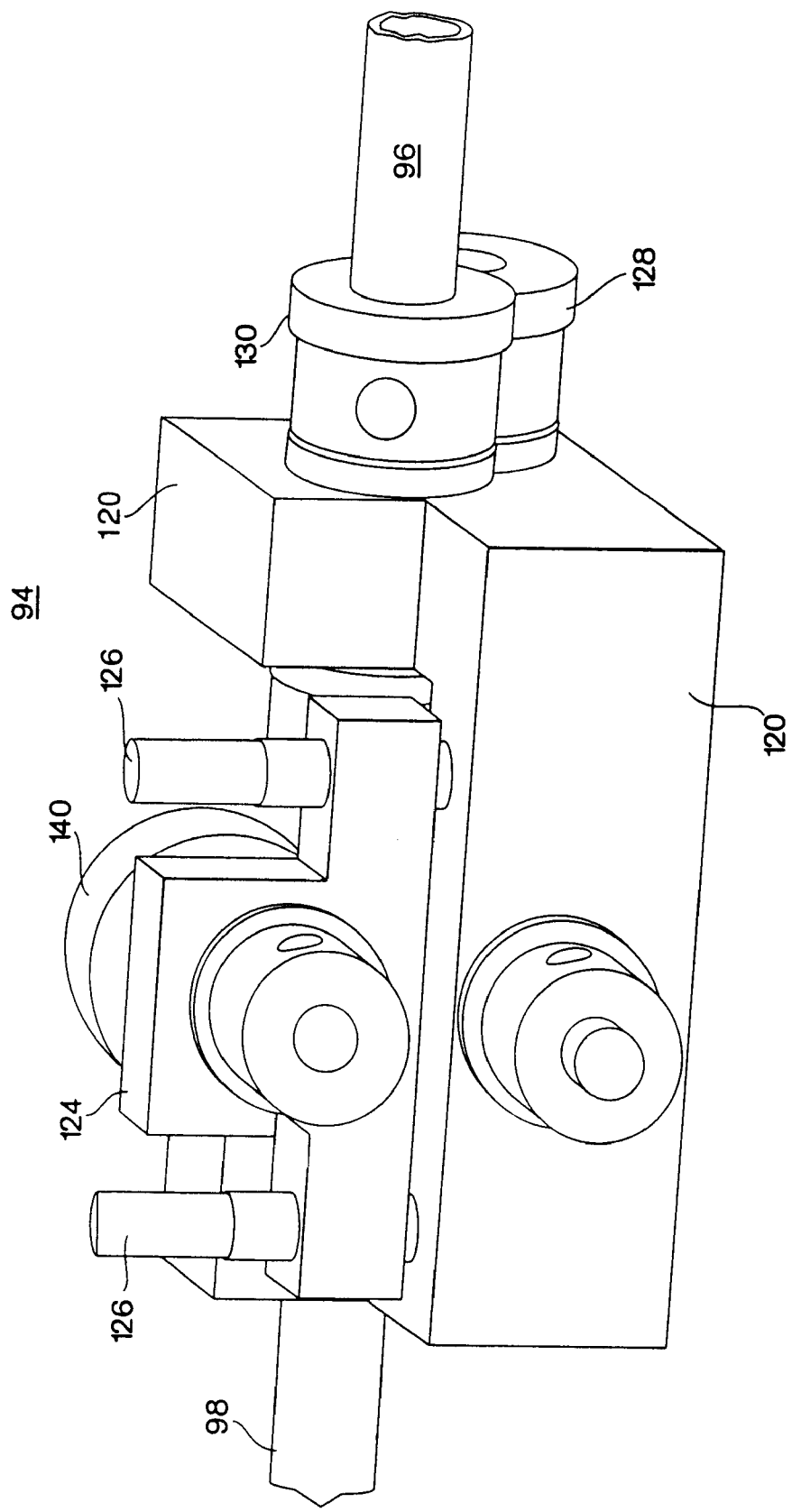
FIG. 9 is a rear perspective diagram of the carriage assembly of FIG. 8 showing the clamping member in a clamped position.

FIGS. 6–9 provide further views of the carriage assembly 94. FIG. 6 is a frontal perspective view of the carriage assembly 94 alone; FIG. 7 is frontal perspective view of the carriage assembly 94 in which wheels 140 and 122 engage a tube 76; FIG. 8 is a rear perspective view of the carriage member 94 in an unclamped position; and FIG. 9 is a rear perspective view of the carriage member 94 in a clamped position.

A three-sided carriage body 120 provides support for the following components: the shaft segments 96 and 98; a drive pinch wheel 122; a clamp member 124 supported by posts 126; mutually engaged wheels or gears 128 and 130; a miter wheel or gear 132 mounted on the same shaft as the wheel 128; and a collar 134 mounted on the same shaft as the wheel 130. The miter wheel 132 engages another miter wheel or gear 136 mounted on the same shaft 138 as the drive pinch wheel 122. An idle pinch wheel 140 is mounted on the clamp member 124.

The carriage body 120 is secured to the shaft segment 98 so that rotation of the shaft segment 98 about the axis 81 causes the carriage 94 to rotate about the axis 81. The wheel 130 and retaining collar 134 are mounted on the body 120 such that the wheel 130 can rotate about the axis 81 independent of rotation of the body 120 about the axis 81. The wheel 128 and miter wheel 132 are also mounted to rotate freely with respect to the body 120. Accordingly, the wheel 130 can impart rotation to the miter wheel 132 via wheel 128 independent of rotation of the body 120 about the axis 81.

In preparation for use of the actuator 70, the clamp member 124 is brought to the unclamped position depicted in FIG. 8. The tube 76, 78 or 80 is inserted through the shaft segments 96 and 98 along the actuation axis 81. The clamp member 124 is then brought to the clamped position of FIG. 9, such that the pinch wheels 122 and 140 engage the tube as shown in FIG. 7. Although not shown in the Figures, the posts 126 are preferably threaded in order to help secure the clamp member 124 to the body 120. A pair of springs is preferably disposed on each post 126, one between the body 120 and the clamp member 124 and one between the clamp member 124 and a retaining nut threaded onto the post 126. The clamp member 124 is moved between the clamped and unclamped positions by adjustment of the retaining nuts.

During operation of the actuator 70, rotation of the tube by a user results in rotation of the carriage assembly 94 about the axis 81. This rotation has two effects. The rotation is communicated to the encoder within the assembly 116 via shaft 98, wheels 104 and 112, and shaft 108 of FIG. 5. The rotation is also communicated to the encoder within assembly 114 by the following mechanism: The wheel 128 revolves about the axis 81 as the carriage 94 rotates. However, for pure rotation the wheel 128 does not rotate at all relative to wheel 120. Therefore the wheel 130 is caused to rotate by the non-rotating wheel 128. The rotation of wheel 130 is communicated to the encoder within assembly 114 by the shaft 96, the wheels 102 and 110, and the shaft 106 of FIG. 5.

Axial translation of the tube by a user causes the pinch wheels 122 to rotate, in turn causing miter wheels 136 and 132 to rotate. This rotation is communicated to the assembly 114 via wheels 128 and 130, along with the shaft 96, the wheels 102 and 110, and the shaft 106 of FIG. 5.

Haptic feedback is provided to the user by the application of axial forces and torques to the tube by the motors within the assemblies 114 and 116. The mechanical paths by which the torque of the motors is communicated to the tube are the reverse of the above-described paths by which user-generated movements are communicated to the encoders.

Figure 10:
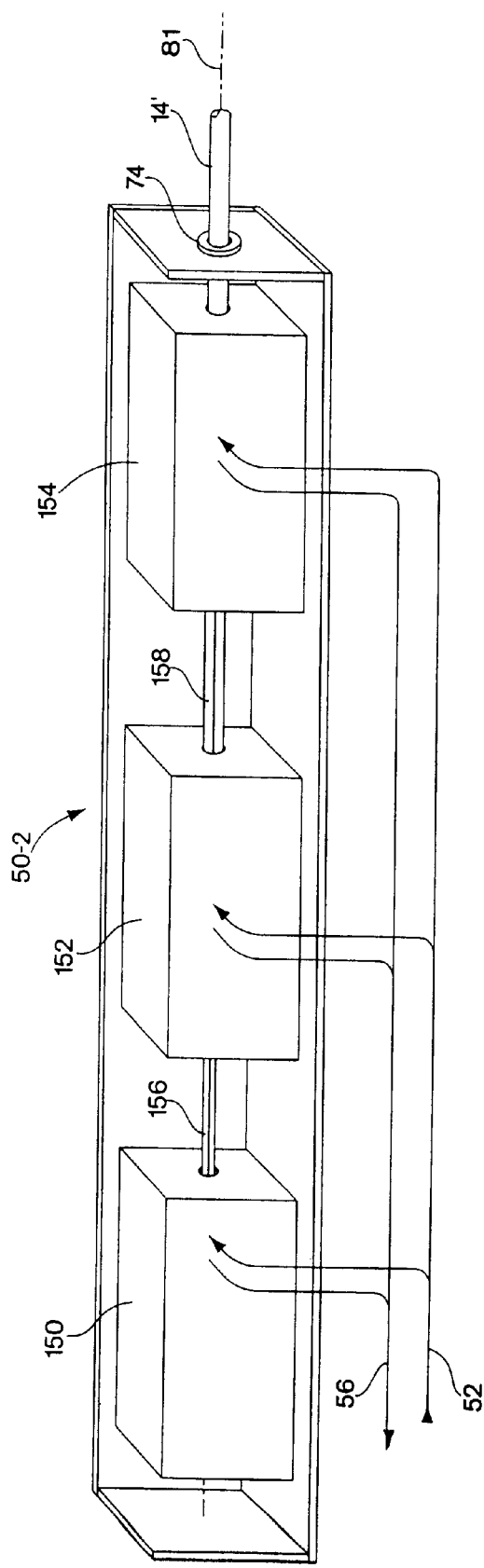
FIG. 10 is a perspective diagram of a second embodiment of an actuator assembly for the system of FIG. 2 including schematically-depicted actuators.

FIG. 10 shows a second embodiment of an actuator assembly 50-2 employing three actuators 150, 152, and 154 represented schematically. Like the actuator 70, the actuators 150, 152 and 154 perform both sensing and actuation for both translation and rotation. The actuators 150, 152 and 154 are generally similar to each other in construction. Each actuator engages a different-sized rigid tube having a square cross-section. The tubes 156 and 158 shown in FIG. 10 are attached to the catheter 12' and the wire 10', while a tube (not shown in FIG. 10) within actuator 154 is attached to the catheter 14'. Because of the manner in which each actuators 150, 152 and 154 engages the corresponding tube, there are minor differences in their internal structure as described below.

Figure 11:
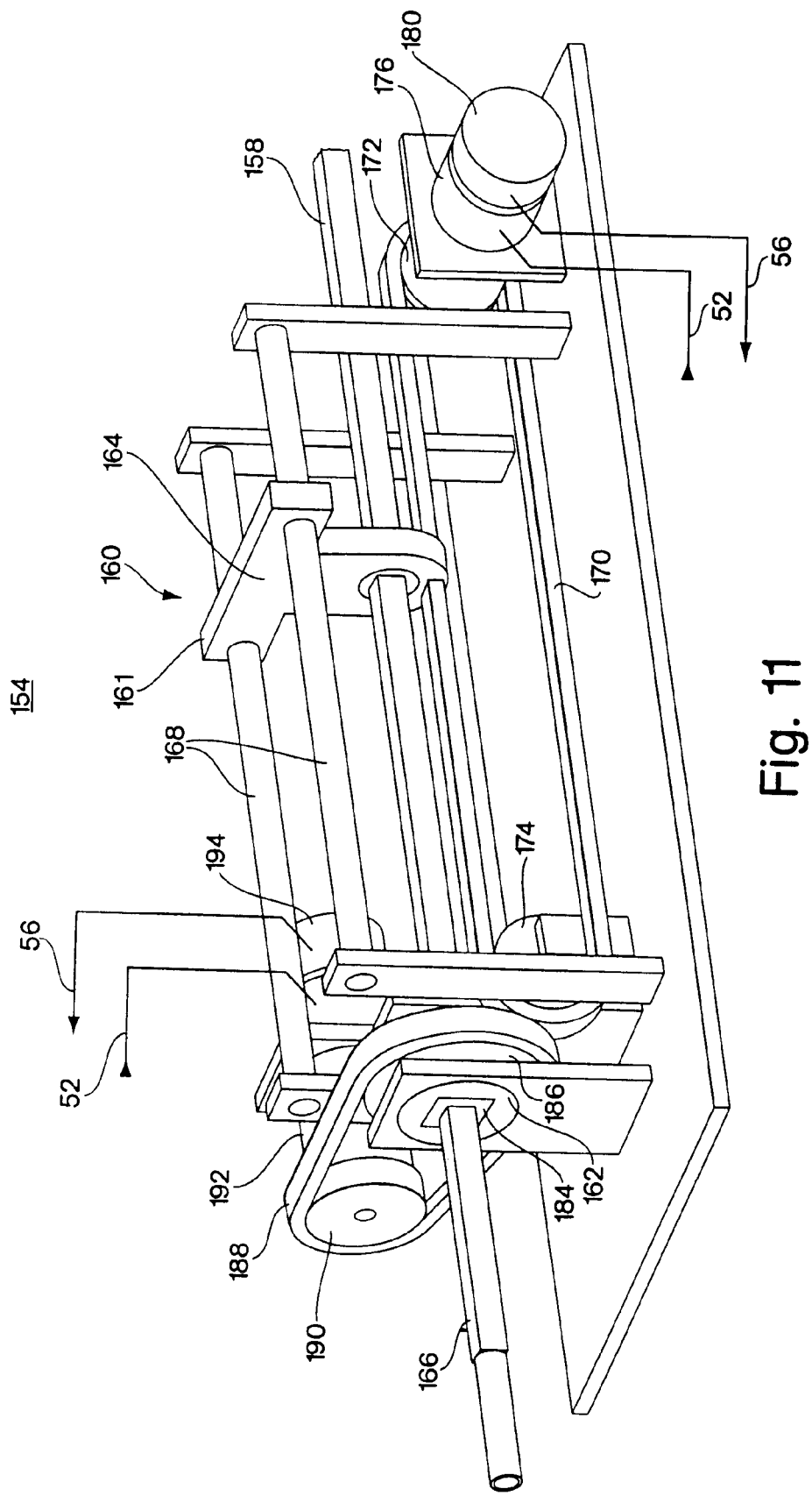
FIG. 11 is a perspective diagram of an actuator in the actuator assembly of FIG. 10.

FIG. 11 shows the actuator 154 used with the outermost catheter 14'. The actuator 154 has a linear actuator 160 and a rotary actuator 162. The linear actuator 160 includes a generally T-shaped carrier 161 and a rotary bearing 164 that grips a tube 166 but allows the tube to be rotated about its longitudinal axis. The tube 166 is attached to the outermost catheter 14'. The linear actuator 160 slides along rails 168, and is attached to a cable loop or belt of cable 170 extending between a drive pulley 172 and an idle pulley 174. The drive pulley 172 is rotated by a motor 176, and its rotary position is sensed by a position encoder or sensor 180. As the linear actuator 160 moves along the rails 168, the tube 166 moves along its axis while its rotational position is unconstrained.

The rotary actuator 162 includes a linear bearing 184 having a square opening through which the tube 166 passes. The linear bearing 184 tracks and controls the rotational position of the tube 166 while allowing the tube to be translated along its longitudinal axis. The rotary actuator 162 is also attached to a pulley 186 driven by a cable loop or belt 188, a drive pulley 190, and a motor 192. A rotary position encoder 194 senses the rotary position of the drive pulley 190. As the rotary actuator 162 rotates, the tube 166 also rotates along its longitudinal axis while its translational position is unconstrained. In the illustrated embodiment the tube 166 is constrained to rotate with rotary actuator 162 due to its square cross section. In alternative embodiments, the tubes within the actuators 150, 152 and 154 may have other cross-sectional shapes that constrain rotation, such as triangular, hexagonal, spline, etc.

The actuators 150 and 152 of FIG. 10 are essentially the same as the actuator 154, except that the bearings 162 and 164 are made to accommodate the narrower tubes 156 and 158. Also, it should be noted that the tube 158 is sufficiently narrower than the tube 166 to rotate independently within it, and likewise tube 156 rotates within tube 158. The belts 170 and 188 are preferably steel cables or bands riding within grooves in the rims of the pulleys 172, 174, 186, and 190. Alternatively, the pulleys may be sprocket-like wheels, and the belts 170 and 188 may be chain or of alternative construction with an undulating inner surface for engaging the teeth on the sprocket-like pulleys.

The foregoing has described an actuation system useful for providing haptic feedback to the user of an elongated object such as a catheter. It will be apparent to those skilled in the art that modification to and variation of the above-described methods and apparatus are possible without departing from the inventive concepts disclosed herein. In particular, the system may be used with medical procedures other than the catheterization of cardiac or peripheral vasculature, such as for example interventional radiology, urology, and other catheter-like procedures. Accordingly, the invention should be viewed as limited solely by the scope and spirit of the appended claims.

What is claimed is:

1. An actuator for an elongated object, comprising:

a plurality of motors; and a carriage assembly mechanically coupling the motors to the object, the carriage assembly being configured to apply mutually independent axial force and axial torque to the object in response to respective torques generated by the motors in response to respective drive signals supplied thereto;

wherein the carriage assembly includes a pair of pinch roller wheels mechanically coupled to one of the motors to be rotated thereby, the pinch roller wheels being disposed on opposite sides of the object in compression relationship and being operative to axially translate the object when rotated by the one motor.

2. An actuator according to claim 1, wherein the pinch roller wheels rotate about respective axes orthogonal to an actuation axis, and wherein the pinch roller wheels are coupled to the one motor by (i) a wheel mechanically coupled to the one motor, the wheel being supported to rotate about an axis parallel to the actuation axis, (ii) a first miter wheel mechanically coupled to the wheel and operative to rotate about an axis parallel to the actuation axis, and (iii) a second miter wheel disposed on a shaft which also drives one of the pinch roller wheels, the second miter wheel being engaged by the first miter wheel such that rotation of the first miter wheel causes rotation of the one pinch roller wheel.

3. An actuator according to claim 1, further comprising:

a clamping mechanism on which one of the pinch roller wheels is disposed, the clamping mechanism being operative in an unclamped position to hold the pinch roller wheels apart to allow the insertion and removal of the object to and from the actuator, and the clamping mechanism being operative in a clamped position to hold the pinch roller wheels together in compression relationship to engage the object.

4. An actuator according to claim 1, further comprising sensors operative to generate sense signals indicative of axial translation and axial rotation of the object.

5. An actuator according to claim 1, wherein the elongated object is one of a catheter and a wire.

6. An actuator for an elongated object, comprising:

a base;

a pair of carriage support pedestals extending from the base, each pedestal having an opening therein being aligned with the opening in the other pedestal, the openings defining an actuation axis along which the object is to be axially translated and about which the object is to be axially rotated when the object is disposed through the openings in an actuatable position;

two tubular shaft segments, each shaft segment being disposed through the opening of a corresponding support pedestal along the actuation axis;

a rotation control wheel mounted on one of the shaft segments;

a translation control wheel mounted on the other shaft segment;

a carriage mounted on the shaft segments in a manner allowing for rotation of the carriage about the actuation axis;

a pair of pinch roller wheels on the carriage on opposite sides of the actuation axis, the pinch roller wheels being operative to hold the object such that the object is rotated about the actuation axis when the carriage is so rotated, the pinch roller wheels being further operative to translate the object along the actuation axis when the pinch roller wheels are rotated;

a pair of intermeshed miter wheels on the carriage, the miter wheels being mechanically coupled to the pinch roller wheels and to the translation control wheel to rotate the pinch roller wheels in response to the rotation of the translation control wheel;

two motors, one motor being coupled to the rotation control wheel and the other motor being coupled to the translation control wheel, each motor being operative to rotate the coupled control wheel in response to a corresponding drive control signal applied to the motor; and two sensors, each sensor being coupled to a corresponding motor and being operative to generate a corresponding sense signal indicating the rotational position of the coupled motor.

7. An actuator according to claim 6, further comprising the following:

two pairs of drive support pedestals, the pairs extending from the base on opposite side of the actuation axis, each pedestal in each pair having an opening therein being aligned with a corresponding opening in the other pedestal of the pair in a direction parallel to the actuation axis;

two drive shafts, each drive shaft extending through the openings of a corresponding pair of drive support pedestals and being coupled to a corresponding one of the motors to be rotated thereby; and two drive wheels, each drive wheel being mounted on a corresponding one of the drive shafts, one drive wheel engaging the translation control wheel and the other drive wheel engaging the rotation control wheel.

8. An actuator according to claim 6, wherein the elongated object is a catheter.

9. An actuator according to claim 6, wherein the elongated object is a wire.

* * * * *